US005836067A

United States Patent [19]

Cochran

[11] Patent Number: 5,836,067

[45] Date of Patent: Nov. 17, 1998

[54] TOOL FOR REMOVING HUB ASSEMBLIES FROM OUTBOARD STERN DRIVE ENGINES

[76] Inventor: Walter D. Cochran, 5449 Frazier Rd., Buford, Ga. 30518

[21] Appl. No.: 701,474

[22] Filed: Aug. 22, 1996

[51] Int. Cl.[6] .................... B23P 19/04

[52] U.S. Cl. .................... 29/263

[58] Field of Search .................... 29/263, 264, 258–260, 29/256, 265

[56] References Cited

U.S. PATENT DOCUMENTS

| | | | |
|---|---|---|---|
| 1,897,737 | 2/1933 | Snarr | 29/263 |
| 3,887,989 | 6/1975 | Maynard . | |
| 4,236,291 | 12/1980 | Barrow . | |
| 4,420,864 | 12/1983 | Hoyt | 29/263 |
| 4,724,608 | 2/1988 | Parrott . | |
| 4,852,235 | 8/1989 | Trease et al. . | |
| 4,864,709 | 9/1989 | Klucz et al. . | |
| 4,977,661 | 12/1990 | Wood . | |
| 5,226,208 | 7/1993 | Gracey . | |

*Primary Examiner*—Robert C. Watson
*Attorney, Agent, or Firm*—Hinkle & Associates, P.C.

[57] ABSTRACT

A tool 50 for removing a hub assembly (6) from a chamber (14) in a gear housing (4) of an outboard engine (2) has a cylindrical body (52) with a first end (54) and a second end (56). Proximate the first end is a flange (98) for seated engagement over an opening (18) to the chamber to limit the depth the tool enters the chamber. At the second end is a bore (66) with protruding teeth (70) for engaging longitudinal grooves (26) of a shaft (8) of the hub assembly to prevent the shaft from rotating. A nut (78) with depending disc (82), a pair of washers (92) and a flat roller bearing (94) are disposed into a recess (72) that is concentrically aligned and congruent with the bore. The nut engages a threaded end (22) of the shaft and pulls the hub assembly axially within the chamber toward the tool until a bearing carrier (10) of the assembly engages the tool. The tool is removed from the hub assembly and the hub assembly is gently pulled from the chamber using nominal force.

15 Claims, 4 Drawing Sheets

TOOL FOR REMOVING HUB ASSEMBLIES FROM OUTBOARD STERN DRIVE ENGINES

BACKGROUND OF THE INVENTION

I. Field of the Invention

The present invention relates generally to the field of outboard stern drive engines. More particularly, the present invention relates to a device for removing a bearing carrier that is aligned along a propeller shaft and disposed within a gear housing of a stern drive outboard engine.

II. Description of the Related Art

In order to conduct maintenance within the gear housing of a stern drive outboard engine, it is often necessary to remove a bearing carrier, which is aligned along a propeller shaft, from a chamber of the gear housing. After a relatively short period of use, especially when exhaust gases are directed along with water through the gear housing, corrosion develops and welds or locks the bearing carrier within the chamber of the gear housing. Because the bearing carrier is typically made of aluminum and unable to resist any significant shear force, a non-axial force placed on the bearing carrier can easily damage or break the bearing carrier. Additionally, this non-axial force can damage the chamber of the gear housing.

It is well known to use a slide hammer assembly to remove the bearing carrier. The slide hammer has long puller jaws which are employed to hook over radially extending flanges of the bearing carrier disposed within the chamber of the gear housing. The carrier is pulled out by utilizing the side hammer to exert a pull force on these bearing flanges. This operation often results in a cocking of the bearing carrier and thus directs non-axial forces on the bearing carrier by repeated use of the slide hammer. Frequently, the radially inwardly extending flanges break off from the application of these non-axial forces. It is then necessary to chisel the unit out, a time consuming and wasteful operation.

A bearing carrier puller for outboard motors described in U.S. Pat. No. 4,236,291 by Barrow has a generally bell-shaped puller block that seats about a propeller shaft orifice with a propeller shaft extending through the puller block. An elongated, exteriorly threaded sleeve extends through the puller block and seats at one end against a thrust hub of the propeller shaft. A sleeve nut is threaded onto the other end of the sleeve outwardly of the puller block with a thrust washer interposed therebetween. Outwardly of the nut, a ring member, which has an elongated handle extending therefrom, is secured to the sleeve by a plurality of set screws. A propeller shaft nut and washer secure the sleeve about the threaded end portion of the propeller shaft. A wrench is used to turn the sleeve nut, causing the handle to engage a lower portion of the motor and pulls the propeller shaft, bearing carrier and reverse gear along the axis of the propeller shaft.

U.S. Pat. No. 4,864,709 granted to Klucz et al. describes a tool for pulling bearing carriers from outboard units having an elongated, tubular housing with two puller members. The puller members extend longitudinally beyond the end of the housing and are diametrically opposed. Formed in the respective distal free ends of the puller, the members are enlarged, strut-engaging mating surfaces, which have hook-like appearances, to engage two specifically designed struts of the bearing carrier. The housing has internal threads at the opposite end from the puller members for receiving a headed, elongate screw having a head end and a shaft-engaging end. As the head of the screw is turned, the screw rotates with respect to the housing while the shaft-engaging end matingly engages the distal end of the propeller shaft. This action pulls the bearing carrier by the struts along the propeller shaft with the housing as the housing approaches the head end of the screw.

SUMMARY OF THE INVENTION

In accordance with the present invention, it is contemplated that problems which have and continue to exist in this field, the objectives of this invention are to provide a tool for removing hub assemblies from outboard stern drive engines which:

- reduces time and effort in removing the hub assemblies;
- does not damage bearing carriers;
- does not damage chambers containing the hub assemblies;
- reduces expenses in maintenance of the engines;
- reduces risk of injury to operators removing hub assemblies;
- applies force to engine housings instead of bearing carriers; and
- is easy to install and disengage from hub assemblies.

This invention accomplishes the above and other objectives and overcomes the disadvantages of the prior art by providing a tool for removing hub assemblies from outboard stern drive engines that is simple in design and construction, inexpensive to fabricate, and easy to use. The tool has a cylindrical body with a flange disposed at one end to limit the depth of the tool within a chamber of a gear housing of a stern drive portion of the engine. At the other end a bore with teeth engages longitudinal grooves of a shaft of the hub assembly to prevent the shaft from rotating. A nut with a depending disc, a pair of washers and a flat roller bearing are disposed into a recess that is concentrically aligned and congruent with the bore. The nut engages a threaded end of the shaft and pulls the hub assembly axially within the chamber toward the tool until a bearing carrier of the assembly engages the tool. The tool is removed from the hub assembly and the hub assembly is gently pulled from the chamber using nominal force.

It is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Other objects, advantages and capabilities of the invention will become apparent from the following description taken in conjunction with the accompanying drawings showing preferred embodiments of the invention.

BRIEF DESCRIPTION OF THE DRAWINGS

The invention will be better understood and the above objects as well as objects other than those set forth above will become apparent when consideration is given to the following detailed description thereof. Such description makes reference to the annexed drawings wherein.

DESCRIPTION OF THE PREFERRED EMBODIMENTS

Figure 1:
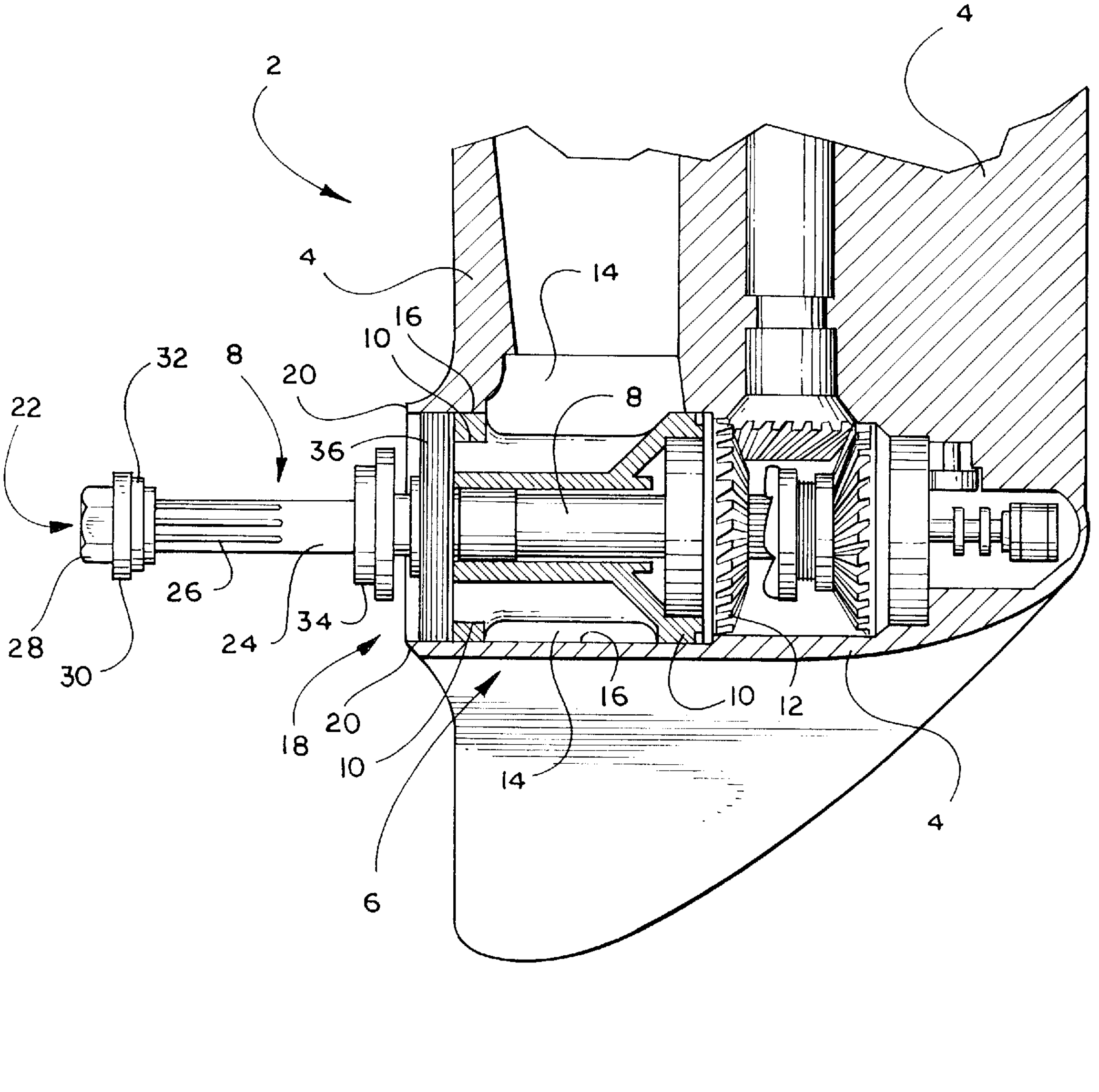
FIG. 1 is a partial, cross-sectional view of a typical gear housing of an outboard stern drive engine with a hub assembly illustrated in cross-section.
Figure 2:
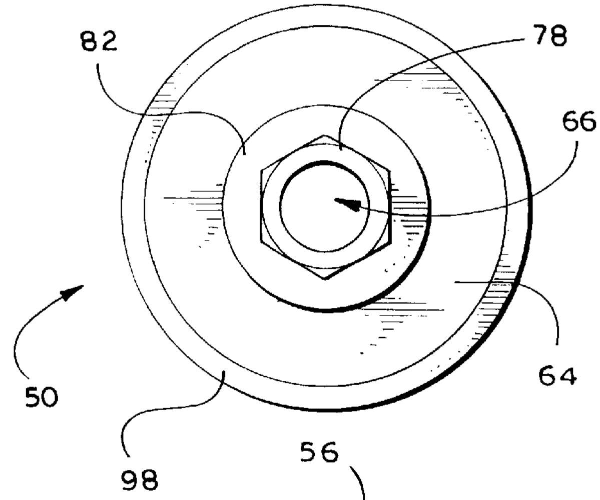
FIG. 2 is a top view of a tool of the present invention.
Figure 3:
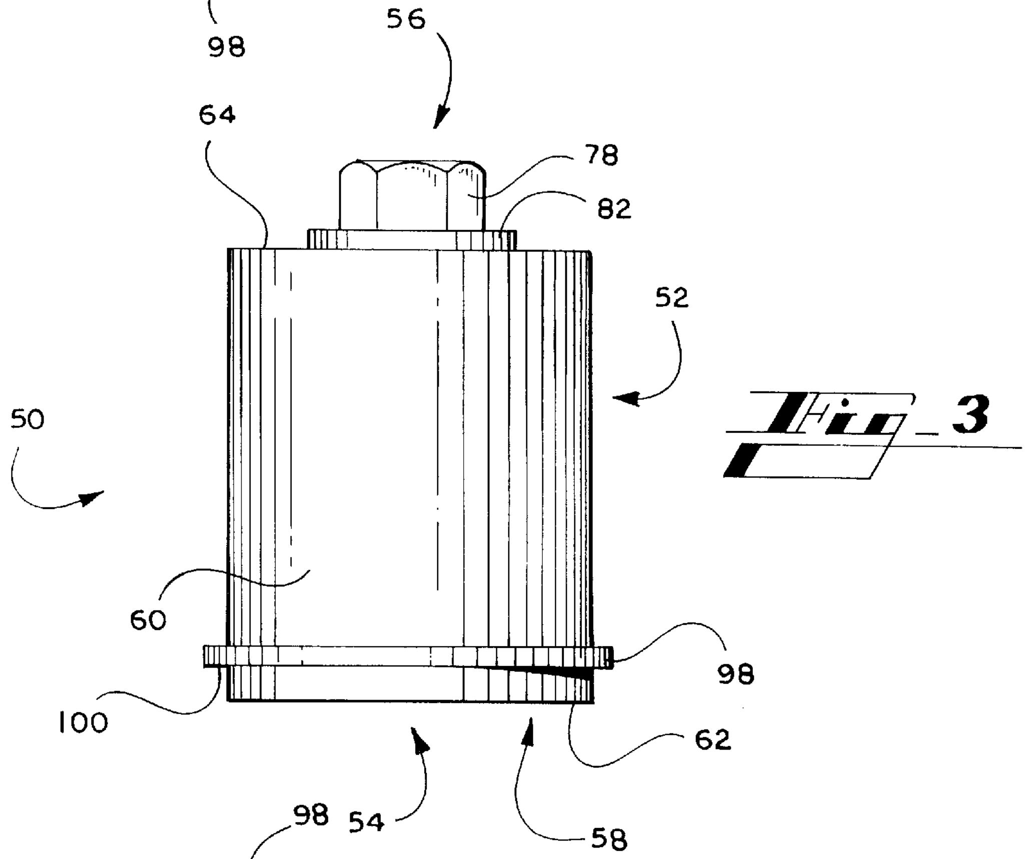
FIG. 3 is a side elevation view of the tool of FIG. 2.
Figure 4:
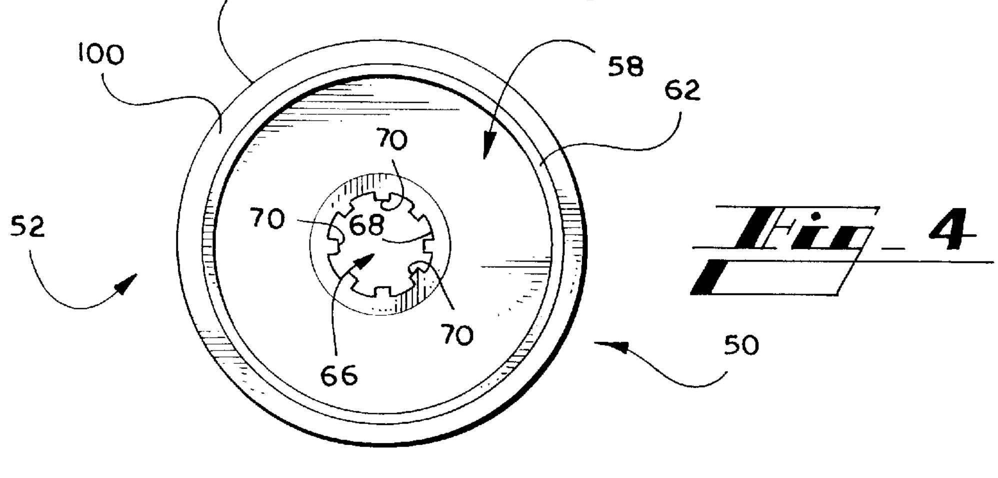
FIG. 4 is a bottom view of the tool of FIG. 2.
Figure 5:
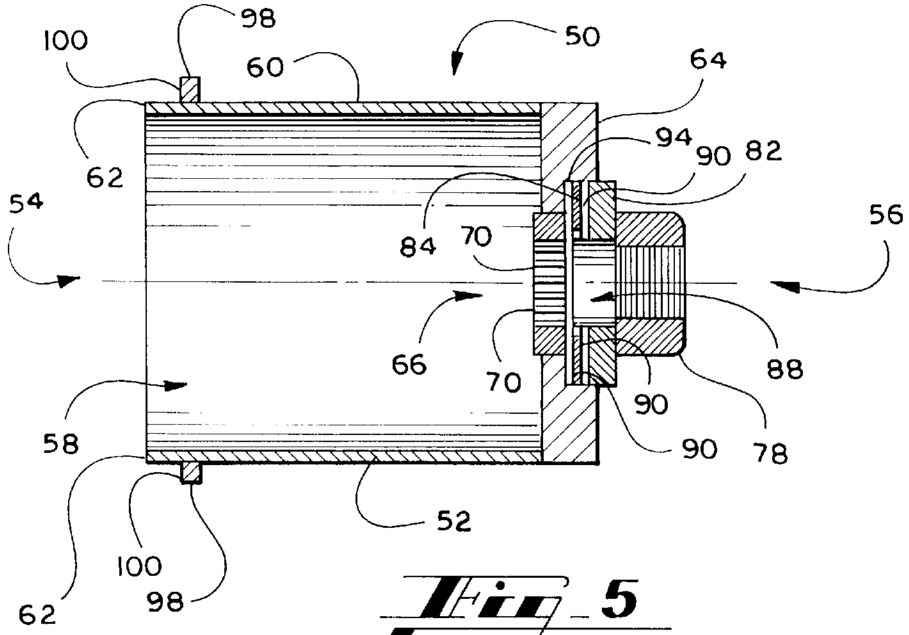
FIG. 5 is a cross-sectional view of the tool taken along line 5—5 of FIG. 3.
Figure 6:
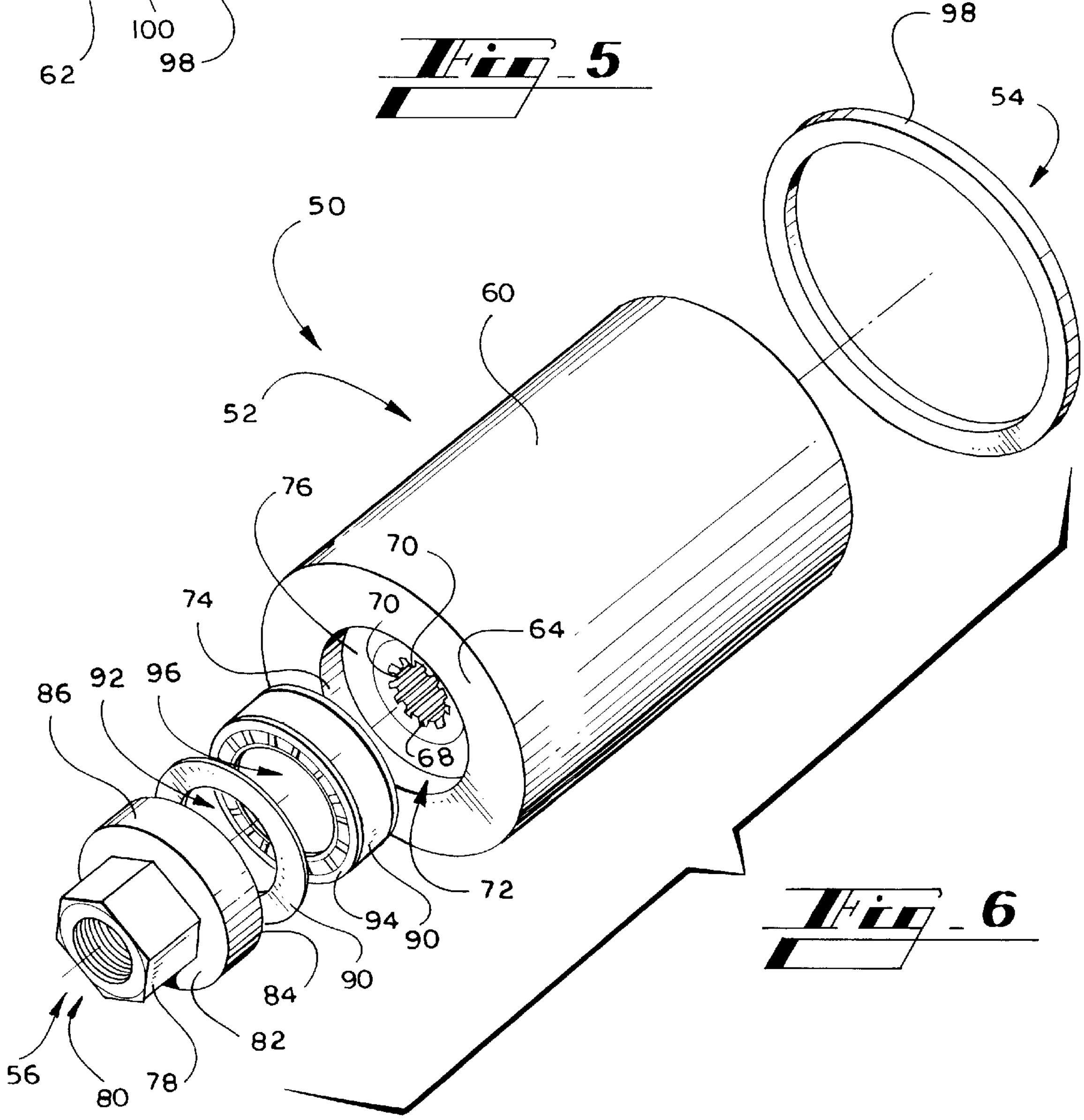
FIG. 6 is an exploded, perspective view of the tool of FIG. 2.
Figure 7A:
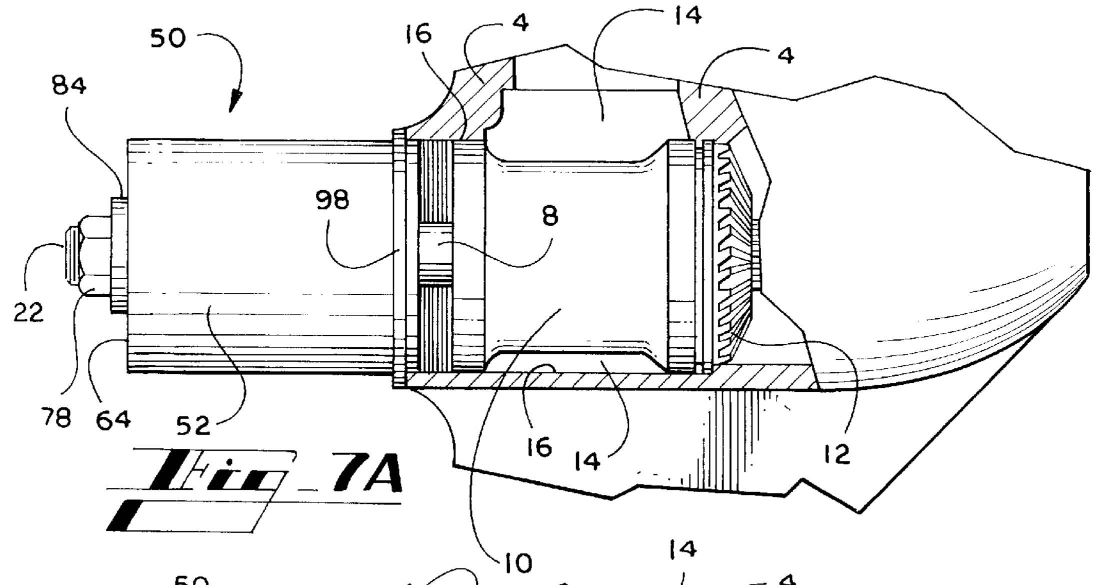
FIG. 7A is a fragmentary illustration of the gear housing, partially shown in section and with the tool of the present invention operably engaging the hub assembly.
Figure 7B:
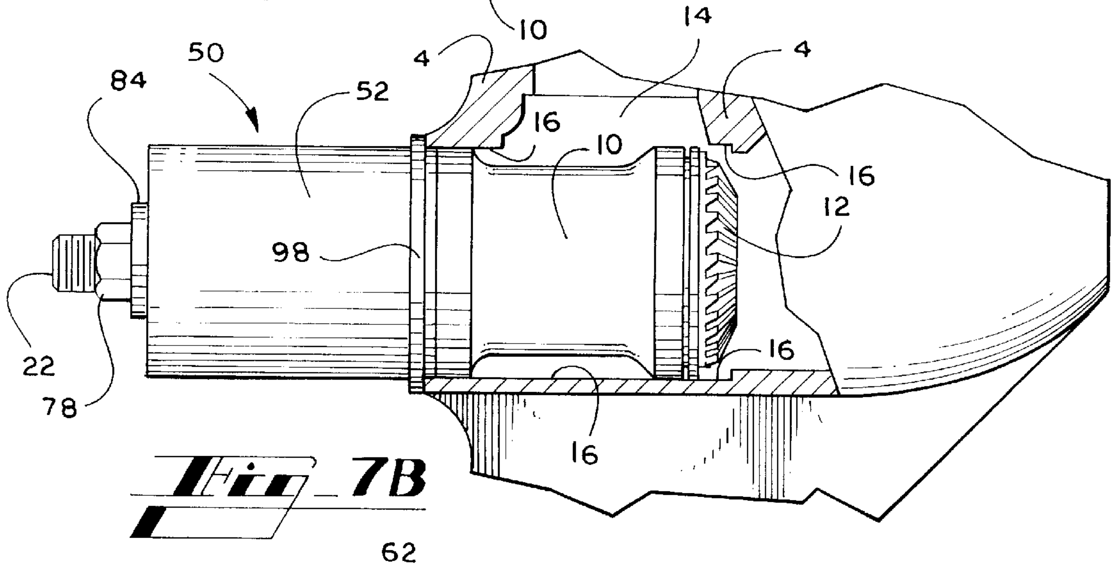
FIG. 7B is a fragmentary illustration of the gear housing, partially shown in section and with a bearing carrier of the hub assembly engaging a stop of the tool of the present invention.
Figure 7C:
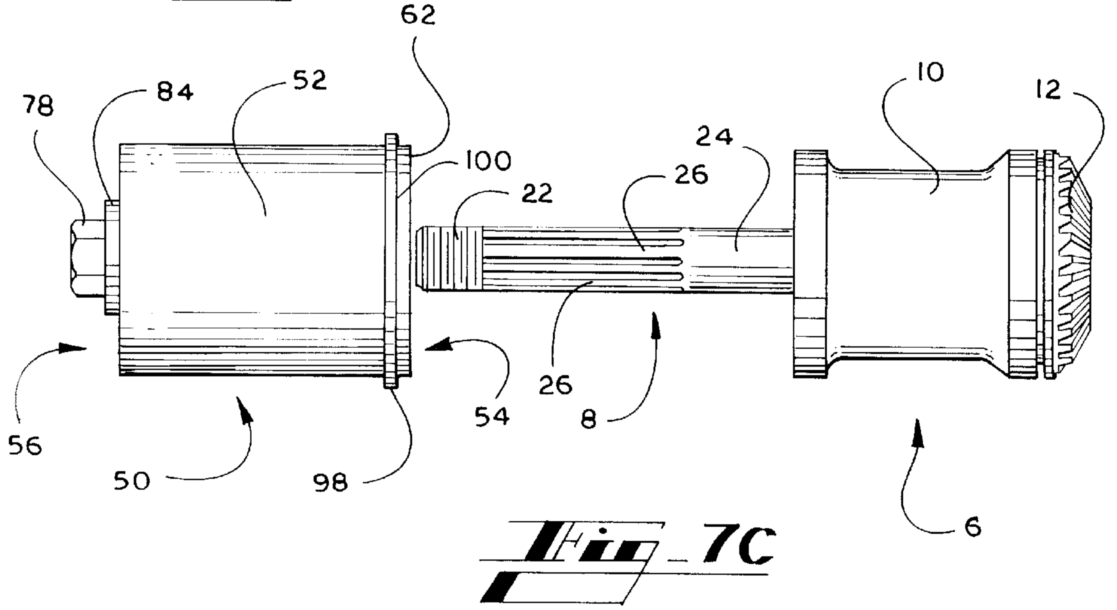
FIG. 7C is a side, elevation view of the tool of the present invention disengaged from the hub assembly.

For a fuller understanding of the nature and desired objects of this invention, reference should be made to the following detailed description taken in connection with the accompanying drawings. Referring to the drawings wherein like reference numerals designate corresponding parts throughout the several figures, reference is made first to FIG. 1. FIG. 1 of the drawings illustrates a partial, cross-sectional view of a lower portion of a typical outboard stern drive engine 2, particularly showing a gear housing 4 with a hub assembly 6 illustrated in cross-section. The hub assembly 6 generally comprises a shaft 8, a bearing carrier 10 disposed on the shaft 8 and a reverse gear 12 operatively connected to the shaft 8. As illustrated, the shaft 8, the bearing carrier 10 and the reverse gear 12 are in their assembled operating positions within a chamber 14 and various structural details of the gear housing 4 have been omitted or simplified for the sake of clarity. Typically, engine exhaust gases are directed through the chamber 14 which causes corrosion, resulting in the bearing carrier 10 being frozen or welded to a chamber wall 16. An annular flared opening 18 congruent with the chamber 14 is conventionally defined in the gear housing 4 of outboard motors or outdrive units of inboard-outboard motors. Adjacent and congruent with the circumference of the opening 18 is a rim 20. The shaft 8 protrudes from the chamber 14 through and beyond the opening 18 and terminates at a distal threaded end 22. Embedded around a circumferential surface 24 of the shaft 8 proximate the threaded end 22 are a plurality of spaced apart longitudinal grooves 26. Space along the shaft 8 from the threaded end 22 to the bearing carrier 10 are a propeller nut 28, a tab washer 30, a spline washer 32, a propeller (not shown), a thrust hub 34 and a retainer 36.

Referring now to FIGS. 2 through 6, a tool 50 for removing the hub assembly 6 from the chamber 14 is illustrated in various views. The tool 50 has a cylindrically-shaped body 52 having a first end 54, a second end 56, a cavity 58 disposed between the first and second ends 54 and 56 and a body outer surface 60. It is preferred for the body 52 to have an outside diameter less than the diameter of opening 18.

At the first end 54 is an annularly-shaped first end surface 62 acting as a stop to engage the bearing carrier 10 of the hub assembly 6. This feature enables the tool 50 to loosen the bearing carrier 10 free from corrosion that holds it to the chamber wall 16 and limits the axial travel of the hub assembly 6. By limiting travel, any additional devices within the gear housing 4 operatively connected to the hub assembly 6 can be disconnected before the hub assembly 6 is pulled from the chamber 14. Also, opportunity for damaging forces to be applied to the chamber wall 16 or the bearing carrier 10 is minimized. Generally, it has been found that once the hub assembly 6 travels axially through the chamber 14 for a short distance, the hub assembly may be gently removed from the chamber 14 by hand.

Across the second end 56 of the body 52 is a face 64. Disposed proximate the center of the face 64 is a bore 66 in general axial alignment with the cavity 58. The bore 66 has a bore surface 68 and a plurality of spaced apart teeth 70 to matingly engage the grooves 26 of the shaft 8 and prevent rotational movement of the shaft 8. As an alternative to teeth 70, one or more set screws (not shown) can be provided which protrude from the bore surface 68 to engage the shaft 8. In conjunction with the face 64 and the bore 66 and in concentric alignment with the bore 66 is an annular recess 72 having a side wall 74 and a bottom wall 76.

A nut 78 having a threaded opening 80 is provided to simultaneously engage the face 64 and matingly engage a threaded end 22 of the shaft 8 to impart longitudinal outward movement of the hub assembly 6 as the nut 78 is appropriately rotated about the shaft 8 until the bearing carrier 10 engages the first end surface 62. Depending from the nut 78 is a disc 82. The disc 82 has a disc surface 84, a circumferential disc wall 86 that matingly and slidingly engages the side wall 74 of the recess 72 and a disc hole 88. To prevent damage to the grooves 26 of the shaft 8, the disc wall 86 has sufficient longitudinal length to enable the nut 78 to be rotated about the threaded end 22 without contacting the grooves 26. Being generally concentric with the threaded opening 80 of the nut 78, the disc hole 88 has sufficient diameter to receive the shaft 8. A pair of washers 90 and an annular, flat roller bearing 94 are utilized to reduce friction. Each washer 90 has a washer hole 92 which also has sufficient diameter to receive the shaft 8. One washer 90 is placed adjacent to the disc surface 84 and the other washer 90 is placed adjacent to the bottom wall 76 of the recess 72. The roller bearing 94 is placed between the washers 90 to aide in the rotation of the nut 78. As with the disc 82 and the washers 90, the roller bearing 94 has a bearing hole 96 which has sufficient diameter to receive the shaft 8.

Proximate the first end 54 is an annular flange 98 mounted to the body outer surface 60. The flange 98 has a flange surface 100 for seated engagement with the rim 20 of the gear housing 4. As previously discussed, the first end surface 62 limits the axial travel of the hub assembly 6. Preferrably, in combination with the disc 82, the distance between the nut 78 and the flange 98 is such that the nut 78 can be rotated about the threaded end 22 of the shaft until the bearing carrier 10 engages the first end surface 62 before the nut 78 contacts the grooves 26 of the shaft 8. To limit the depth the body 52 travels axially into the chamber, the flange 98 is mounted to the body outer surface 60 at a predetermined distance from the first end 54. The distance selected is based upon the type and size of the engine 2. Preferably, the flange 98 is mounted such that the distance from the flange surface 100 to the first end 54 is eleven-sixteenth (11⁄16) of one inch. As an alternative to the flange 98, one or more tabs (not shown) mounted to or protruding from the body outer surface 60 can be used to engage the rim 20.

To remove the hub assembly 6 from the chamber 18, an operator removes the propeller nut 28, the tab washer 30, the spline washer 32, the propeller and the thrust hub 34 from the shaft 8. The retainer 36 is then removed from the chamber 14. After spraying the chamber 14 with a lubricant such as oil, the tool 50 is placed over the shaft 8 so that the shaft 8 is inserted into the cavity 58 of the body 52 at the first end 54. The shaft 8 is further disposed through the bore 66 so that the teeth 70 engage the grooves 26 of the shaft 8. After placing the first end 54 of the body 52 into the chamber 14 to seat the flange 98 over the opening 18 from the chamber 14, one washer 90 is placed onto the shaft 8 and set into engagement with the bottom wall 76 of the recess 72. Then, the roller bearing 94 is placed onto the shaft 8. Following the roller bearing 94 onto the shaft 8 is the other washer 90, which is placed in contact with the roller bearing 94. The nut 78 is then screw threaded onto the threaded end 22 of the shaft 8 so that the disc surface 84 contacts the washer 90. By properly rotating the nut 78 about the shaft 8, the hub assembly 6 moves axially toward the opening 18 until the bearing carrier 10 engages the first end 54 of the body 52. Afterwards, removal of the tool 50 is accomplished by removing the nut 78, washer 90, roller bearing 94 and body 52 from the shaft 8. As previously stated, the hub assembly 6 can then be pulled from the chamber 14 by the operator's hands or a slide hammer (not shown) using nominal force after disconnecting any additional devices operatively connected to the hub assembly 6.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A tool for removing a hub assembly from a chamber in a gear housing portion of an outboard engine, comprising:

a body having a first end, a second end, a cavity disposed between the first and second ends and a body outer surface, the first end having a first end surface to engage a bearing carrier of the hub assembly, the second end having a face, the face having a bore in general axial alignment with the cavity;

an annular flange mounted to the body outer surface proximate the first end for seated engagement over an existing annular opening from the chamber;

shaft engagement means congruent with the bore for engaging and preventing rotational movement of a shaft of the hub assembly that extends through both the opening and the bore and protrudes beyond the face; and a nut to simultaneously engage the face and a threaded end of the shaft to impart longitudinal outward movement of the hub assembly as the nut is appropriately rotated about the shaft until the bearing carrier engages the first end surface.

2. A tool as claimed in claim 1, further comprising at least one washer disposed between the nut and the face, the washer having a washer hole having sufficient diameter to receive the shaft.

3. A tool as claimed in claim 1, further comprising a roller bearing being disposed between the nut and the face, the roller bearing having a bearing hole, and the bearing hole having sufficient diameter to receive the shaft.

4. A tool as claimed in claim 2, further comprising a roller bearing disposed between the at least one washer and the face, the roller bearing being having a bearing hole, and the bearing hole having sufficient diameter to receive the shaft.

5. A tool as claimed in claim 1, further comprising a pair of washers disposed between the nut and the face, and a roller bearing being disposed between washers, the washers having a washer hole having sufficient diameter to receive the shaft, the roller bearing having a bearing hole and the bearing hole having sufficient diameter to receive the shaft.

6. A tool as claimed in claim 1, wherein the first end surface is annularly-shaped.

7. A tool as claimed in claim 1, wherein the body is cylindrically-shaped.

8. A tool as claimed in claim 1, wherein the flange is mounted at a predetermined distance from the first end.

9. A tool as claimed in claim 8, wherein the flange is mounted at eleven-sixteenth ($^{11}/_{16}$) of one inch from the first end.

10. A tool for removing a hub assembly from a chamber in a gear housing portion of an outboard engine, comprising:

a body having a first end, a second end and a cavity disposed between the first and second ends, the first end having a first end surface to engage a bearing carrier of the hub assembly, the second end having a face, the face having a bore in general axial alignment with the cavity, and an annular recess concentric with the bore, the recess having a side wall and a bottom wall;

housing engagement means located proximate the first end for seated engagement over an existing annular opening from the chamber;

shaft engagement means congruent with the bore for engaging and preventing rotational movement of a shaft of the hub assembly that extends through both the opening and the bore and protrudes beyond the face; and a nut to simultaneously engage the face and a threaded end of the shaft to impart longitudinal outward movement of the hub assembly as the nut is appropriately rotated about the shaft until the bearing carrier engages the first end surface, the nut having a threaded opening and a depending disc, the disc having a disc surface to slidingly engage the bottom wall, a circumferential disc wall to matingly and slidingly engage the side wall, and a disc hole, and the disc hole being generally concentric with the threaded opening of the nut and having a sufficient diameter to receive the shaft.

11. A tool as claimed in claim 10, further comprising at least one washer disposed between the disc surface and the bottom wall, the at least one washer having a washer hole having sufficient diameter to receive the shaft.

12. A tool as claimed in claim 10, further comprising a roller bearing being disposed between the disc surface and the bottom wall to reduce friction, the roller bearing having a bearing hole, and the bearing hole having sufficient diameter to receive the shaft.

13. A tool as claimed in claim 11, further comprising a roller bearing disposed adjacent the at least one washer to reduce friction, the roller bearing having a bearing hole, and the bearing hole having sufficient diameter to receive the shaft.

14. A tool for removing a hub assembly from a chamber in a gear housing portion of an outboard engine, the hub assembly having a shaft extending beyond an annular opening from the chamber, the shaft having at least one longitudinal groove, the tool comprising:

a body having a first end, a second end and a cavity disposed between the first and second ends, the first end having a first end surface to engage a bearing carrier of the hub assembly, the second end having a face, the face having a bore in general axial alignment with the cavity, the bore having a bore surface, the bore surface having at least one depending tooth to matingly engage the at least one longitudinal groove of the shaft to prevent rotational movement of thereof;

housing engagement means located proximate the first end for seated engagement over the opening from the chamber; and a nut to simultaneously engage the face and a threaded end of the shaft to impart longitudinal outward movement of the hub assembly as the nut is appropriately rotated about the shaft until the bearing carrier engages the first end surface.

15. A tool for removing a hub assembly from a chamber in a gear housing portion of an outboard engine, comprising:

a cylindrically-shaped body having a first end, a second end and a cavity disposed between the first and second ends, the first end having a first end surface to engage a bearing carrier of the hub assembly, the second end having a face, the face having a bore in general axial alignment with the cavity and an annular recess concentric with the bore, the bore having a bore surface, the bore surface having at least one depending tooth to matingly engage at least one longitudinal groove of a shaft of the hub assembly that extends through both the opening and the bore and protrudes beyond the face to prevent rotational movement of the shaft, the recess having a side wall and a bottom wall;

a nut to simultaneously engage the face and a threaded end of the shaft to impart longitudinal outward movement of the hub assembly as the nut is appropriately rotated about the shaft until the bearing carrier engages the first end surface, the nut having a threaded opening and a depending disc, the disc having disc surface, a circumferential disc wall to matingly and slidingly engage the side wall of the recess and a disc hole, the disc hole being generally concentric with the threaded opening of the nut and having sufficient diameter to receive the shaft;

a pair of washers, each washer having a washer hole having sufficient diameter to receive the shaft, one washer disposed adjacent the disc surface and the other washer disposed adjacent to the bottom wall;

an annular, flat roller bearing disposed between the washers to reduce friction, the roller bearing having a bearing hole, the bearing hole having sufficient diameter to receive the shaft; and an annular flange mounted to the body outer surface at a predetermined distance from the first end for seated engagement over an existing annular opening from the chamber.

* * * * *